United States Patent [19]

Simone et al.

[11] Patent Number: 4,669,908
[45] Date of Patent: Jun. 2, 1987

[54] KNOT JOINT FOR NETWORK STRUCTURES

[75] Inventors: Giovanni Simone, Forli'; Franco Orsi, Agugliano, both of Italy

[73] Assignee: Composit System S.r.l., Italy

[21] Appl. No.: 715,475

[22] Filed: Mar. 25, 1985

[30] Foreign Application Priority Data

Mar. 28, 1984 [IT] Italy .................. 20284 A/84
Mar. 5, 1985 [IT] Italy .................. 20992/85[U]
Mar. 5, 1985 [IT] Italy .................. 20993/85[U]

[51] Int. Cl.$^4$ .................. F16B 11/00; F16D 3/00
[52] U.S. Cl. .................. 403/170; 403/245; 403/306; 403/373
[58] Field of Search .............. 403/174, 178, 170, 245, 403/246, 236, 49, 378, 379, 306, 331, 169, 299, 314, 373, 374, 377, 376, 171, 176

[56] References Cited

U.S. PATENT DOCUMENTS

| | | | |
|---|---|---|---|
| 961,981 | 6/1910 | Miller | 403/174 |
| 1,019,872 | 3/1912 | Williams, Jr. | 403/377 |
| 1,856,870 | 5/1932 | Kartrelichvili et al. | 403/170 |
| 2,773,671 | 12/1956 | Leikenspergen | 403/306 |
| 3,174,781 | 3/1965 | Eastman | 403/376 |
| 3,213,273 | 10/1965 | Zagel | 403/306 |
| 3,318,045 | 5/1967 | Lambertson | 403/174 |
| 3,914,060 | 10/1975 | Miller et al. | 403/171 |
| 4,004,393 | 1/1977 | Morris | 403/49 |
| 4,027,449 | 6/1977 | Alcalde Cilveti | 403/171 |
| 4,129,975 | 12/1978 | Gabriel | 403/171 |
| 4,140,414 | 2/1979 | Buttgereit | 403/49 |
| 4,353,662 | 10/1982 | Du Chateau | 403/171 |

FOREIGN PATENT DOCUMENTS 279096 1/1929 United Kingdom .............. 403/174

Primary Examiner—Cornelius J. Husar
Assistant Examiner—Peter M. Cuomo
Attorney, Agent, or Firm—Darby & Darby

[57] ABSTRACT

The present invention pertains to the technical field of network structures and more particularly it relates to a knot joint of the kind adapted to engage a number of rods converging in the joint itself.

According to the invention the joint (1) comprises a central core (2) and first and second couplings in alignment with said rods (3) and connected to said core (2) and said rods (3) respectively, as well as suitable to be engaged with each other by a restrained fixing, said first and second couplings consisting of clamps (8) and inserts (9), the shape of which mates with that of said clamps (8), insertable into the latter by causing them to slide in a sense transverse to the extension direction of said rods (3).

5 Claims, 16 Drawing Figures

KNOT JOINT FOR NETWORK STRUCTURES

FIELD AND BACKGROUND OF THE INVENTION

The present invention relates to a knot joint for network structures and particularly to a polyvalent knot joint for spatial network structures.

It is known that by spatial network system it is meant the modular and space coordinated assembly, according to rational geometrical criteria, of standardized construction units having a differentiated strength and a selected typical conformation. The fulcrum of any network system is the knot joint which receives and joins to each other a number of rectilinear beams converging in the joint itself in order to build as rigid a structure assembly as possible.

There are at present many types of knot joints. For example there are joints provided with spherical or spheroidal cores, hemispherical joints, or joints comprising a polygonal round ring, single elements capable of being assembled together, clamping plates or jaws, tube lengths fixed to spherical cores, rods welded in situ to base couplings, etc. Among them all, one of the most spread joints is the one known under the trademark "Mero" which particularly puts into practice the known art the most relevant to the present invention.

The above joint consists of a substantially solid spheroid machined so as to define faces forming angles of 45° and 90° on the surface thereof. In the middle of each of said faces a threaded hole is worked in which the threaded ends of differently sized rods can be screwed. In theory the screwing only aims at preventing the rods from slipping off and the latter must act as struts engaging said spheroid by compression. In order to allow that several rods can converge towards the same spheroid, said rods are greatly tapered at their ends so that a relatively reduced abutment surface is provided.

Knot joints of this type can give good results in achieving either flat or spatial network structures. However they have some important drawbacks.

In fact the knots thus obtained engage their respective rods so that hinges rather than restrained fixings are obtained and in these network structures it is advisable to have as rigid restrained fixings as possible close to the knots, which allows the rods to be lighter in weight or longer. Furthermore the knot is expensive owing to the fact that several workings have to be carried out on the spheroid and at the end of the rods. Also the cost is a consequence of the fact that the knot is arranged for attachments all of the same type on each spheroid. As a result, the attachments and the rod-shaped elements that will be subjected to lower stresses have to be oversized. Furthermore, different technical solutions involve the accomplishment of highly expensive special knots as they have to be planned and carried out in a specific manner.

The last mentioned aspect of the known art is important as it highly limits the activity of a designer who is obliged to respect the characteristics peculiar to these knots. Anyway no solutions that are very different from the standardized ones are possible owing to the fact that when the rods are too near each other, too small compression or abutment surfaces are created and it is known that screw elements must not undergo shearing stresses.

OBJECTS

In the light of what above it is a general object of the present invention to provide a knot joint for network structures suitable to obviate the above mentioned drawbacks.

Within the scope of this general object it is an important object of the present invention to provide a joint suitable to ensure a very rigid connection with the rods of the corresponding network structure.

A further object of the invention is to provide a joint having a relatively low cost and susceptible of being sized at each point, depending upon the really transmitted stresses.

A still further object of the invention is to provide a knot joint that can be constantly adapted to the specific requirements of the builders without any special workings.

SUMMARY OF THE INVENTION

The foregoing and still further objects which will become more apparent in the following are attained by the knot joint according to the invention for network structures of the kind adapted to engage a number of rods converging in the joint itself and comprising a central core susceptible of being connected through first and second couplings to said rods, said first and second couplings being suitable to be engaged by interlocking into each other, wherein said first and second couplings comprise clamps and inserts, the shape of which is complementary to that of said clamps, insertable into the latter by causing them to slide in a sense transverse to the extension direction of said rods.

BRIEF DESCRIPTION OF THE DRAWINGS

Further features and advantages will become more apparent from the detailed description of a preferred embodiment given by way of example only with reference to the accompanying drawings in which.

DESCRIPTION OF THE PREFERRED EMBODIMENTS

Figure 1:
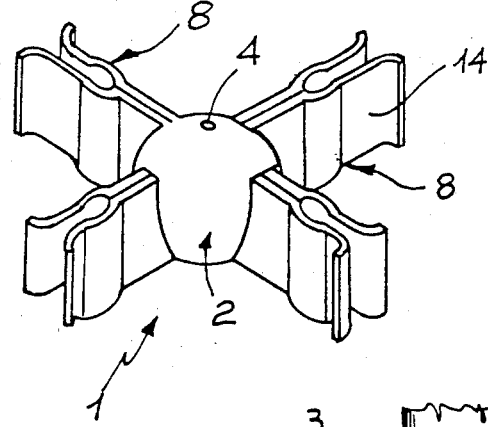
FIG. 1 is a perspective view of the central portion of a joint according to the invention.
Figure 2:
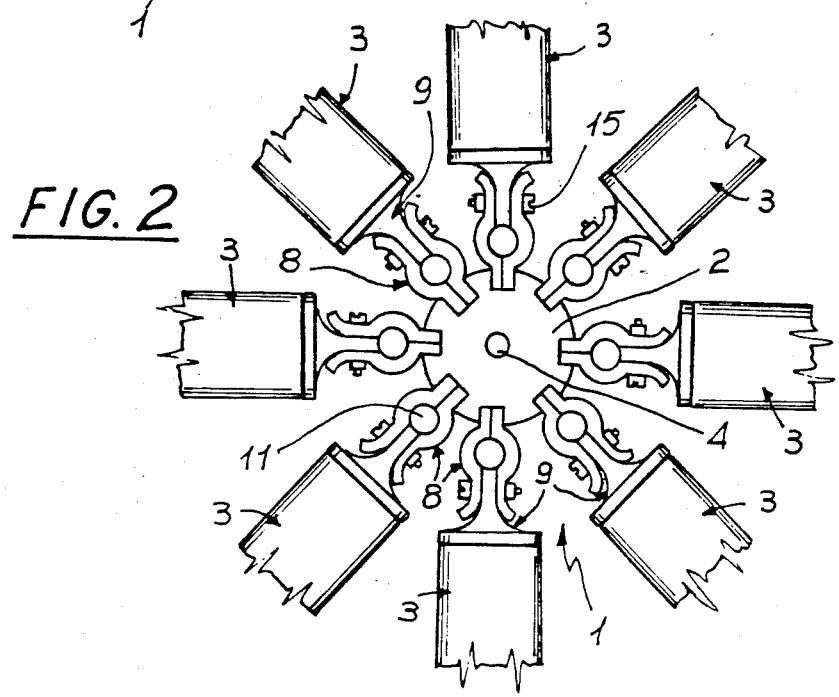
FIG. 2 is a plan view of the joint according to the invention, connected to some rods of a network structure.

Referring to the drawings, the joint according to the invention is generally indicated at 1. Summarily it is defined by a central core 2 and by first and second couplings interposed between the core 2 and the rod 3 forming the network structure.

Figure 9:
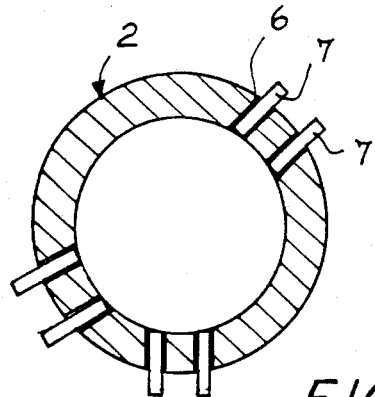
FIGS. 9 and 10 are equatorial and polar sections respectively of the central core of a joint according to the invention.
Figure 10:
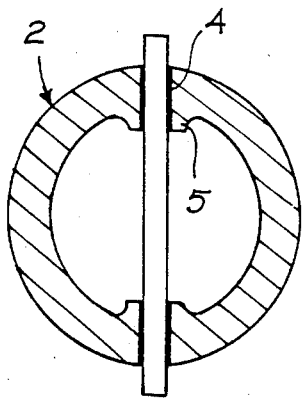

The core 2 preferably consists of a hollow ball (FIGS. 9 and 10) provided with polar holes 4 made in correspondence of swellings 5 in the ball thickness. Said ball can also be concerned with centering holes 6 into which centering pegs 7 are introduced.

Figure 3:
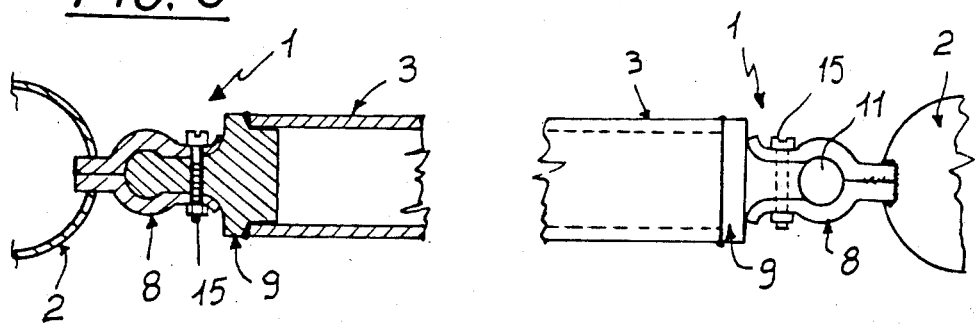
FIG. 3 is partially a front view and partially a sectional view showing how a rod can be engaged, at the two opposite ends thereof, with two joints according to the invention.
Figure 11:
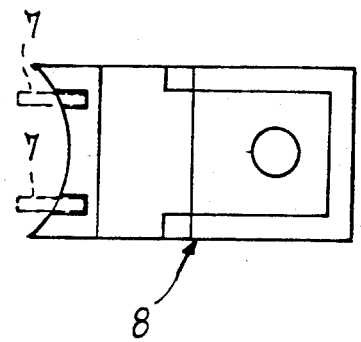
FIG. 11 shows how a clamp of the kind shown in FIGS. 7 and 8 can be positioned on the central core as seen in FIGS. 9 and 10.

Said first and second couplings interposed between the core 2 and the rods 3 consist of clamps 8 and inserts 9. Preferably clamps 8 are connected to the core 2 and inserts 9 to the rods 3. Said connections are carried out by welding. The right alignment is determined, in the case of clamps 8, by the centering pegs 7 (FIG. 11) and, in the case of inserts 9, eventually by a mouthpiece provided at the ends of rods 3 (FIG. 3).

The clamps 8 can be of one piece construction and fork-shaped or made from two shaped portions disposed close to each other. In any case the contact area of the latter with the core 2 is very wide but flattened so that they occupy a small room and do not interfere with other clamps 8 disposed side by side. Clamps 8 allow the introduction of the inserts 9 by sliding in a transverse direction with respect to the development direction of rods 3. They may be provided with at least a stop member 10 which, acting as a limit stop, tends to restrain the introduction of the inserts 9.

Figure 4:
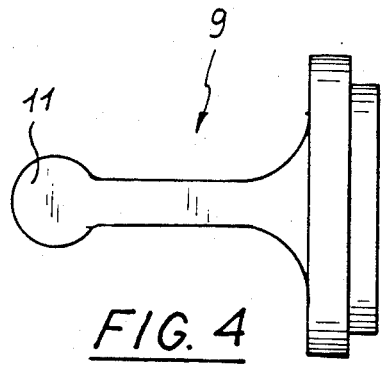
FIGS. 4 to 6 are an elevation, side and plan view respectively of an insert being part of a joint according to the invention.
Figure 5:
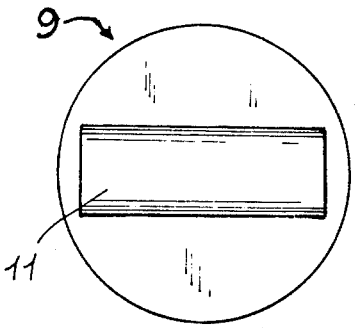
Figure 6:
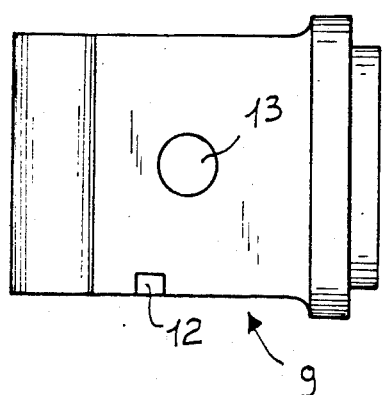
Figure 7:
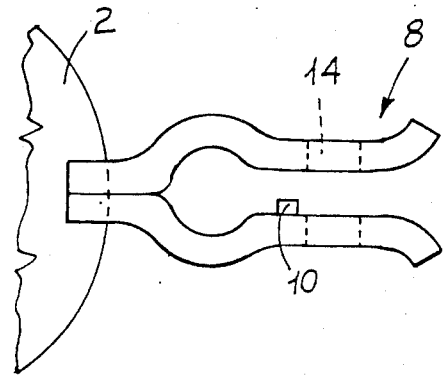
FIGS. 7 and 8 are en elevation and plan view respectively of a clamp suitable to be engaged with the insert as seen in FIGS. 4 to 6.
Figure 8:
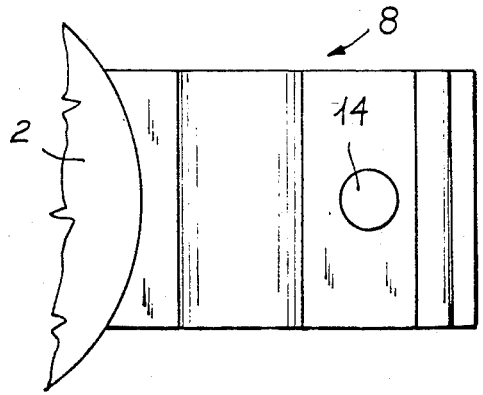
Figure 12:
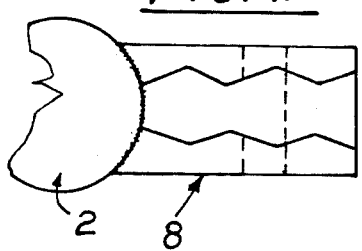
FIGS. 12 and 13 show a clamp and an insert respectively of the same kind as shown in FIGS. 7 and 4 but differently shaped.
Figure 13:
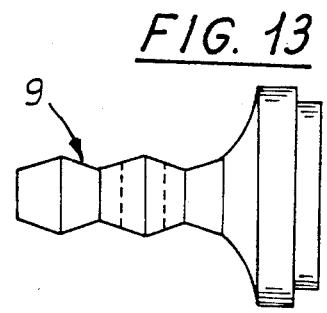

As shown in FIGS. 4 to 6, said inserts 9 have a shape mating with that of the clamps 8 and they are preferably provided with an end tooth 11 adapted to prevent them from axially sliding off. It is however possible to shape both the clamps 8 and the inserts 9 in a different manner, for example giving them the shapes as shown in FIGS. 12 and 13. In this embodiment the contact surfaces have a deep embossment that can replace the tooth 11 and avoid the insert 9 sliding off axially.

Figure 14:
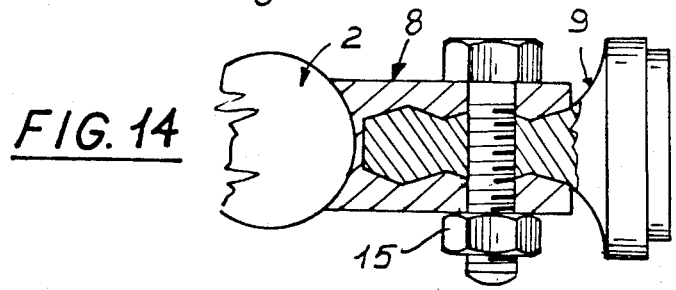
FIG. 14 shows the elements of FIGS. 12 and 13 when assembled.

The inserts 9 are provided with a housing 12 in which the stop member 10 engages and are above all provided, as well as the clamps 8, with through holes 13 and 14 respectively capable of allowing the introduction of a bolt 15 (FIGS. 3 and 14); when the latter has been tightened the clamps 8 cannot be opened. Said through holes 13 and 14 and bolt 15 constitute a locking element and said holes are differently sized with respect to each other so that shearing actions are impossible.

Figure 15:
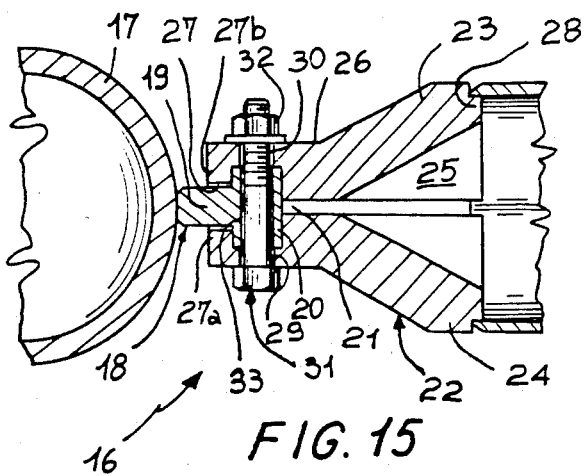
FIG. 15 is a sectional view of a joint provided with its respective clamp and insert according to an alternate embodiment.

According to an alternate embodiment (FIG. 15) at 16 it has been indicated a joint defined by a core 17 preferably consisting of a hollow ball. A number of inserts generally indicated at 18 are provided around said core 17 and integral thereto; each of them consists of a T-shaped prismatic body, the stem 19 of which is disposed normally to the outer surface of said core 17, whereas the head 20 thereof is introduced into a suitably shaped through space 21 presented by a clamp generally indicated at 22.

More particularly, the clamp 22 consists of two portions 23 and 24 having the form of half-shells so that, when they are assembled together and axially fastened to the rods, they form a substantially frusto-conical body 25 the lower base 26 of which extends as far as to define, after said assembling, the above mentioned through space 21. Said space 21 receives the head 20 of the insert 18 while the stem 19 comes out through an opening 27. The opening 27, which is defined by said assembling too, is made up of appropriate projections 27a and 27b symmetrically extending past each of said half-shells 23 and 24, as clearly seen in the figures.

When a welding is carried out along a guide collar 28 of the clamp 22 in order to fix the latter to each rod the two half shells are joined together too.

Transversely to said space 21 two through holes 29 and 30 are provided for the introduction of a fastening bolt 31. The tightening of said bolt by means of a screw nut 32 rigidly fastens the insert 18 to the clamp 22 and at the same time one half-shell 23 to the other half close to the lower base 26 as well. Since the head 20 is introduced, as already said, into the space 21 of the clamp 22, it must also be provided with a through hole 33 allowing said bolt 31 to pass through.

Advantageously the inserts 18 are of one piece construction together with the core 17 and are obtained by molding. This is possible for example if two half-balls are molded, each of them being provided with a number of inserts at right angles to the core surface, and the two parts are then joined together by welding. Otherwise the stem portion 19 of each insert 18 could be radially welded normally to said core 17.

In this embodiment no engagement means is necessary as the positioning of each member is always determined univocally owing to the particular conformations both of the clamps 22 and inserts 18 mutually engaged with each other.

Figure 16:
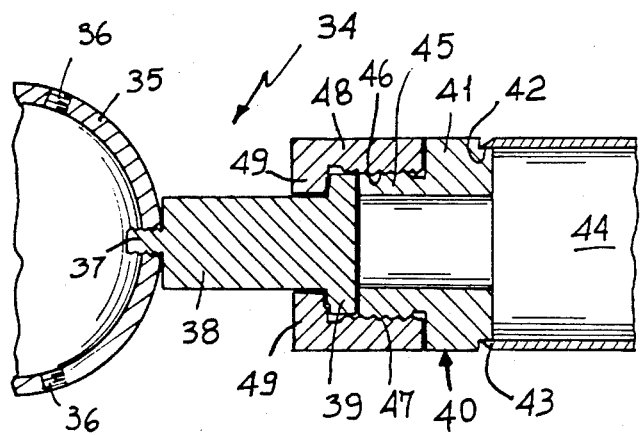
FIG. 16 is a sectional view of a joint provided with all its component parts according to a further alternate embodiment.

Always within the general scope of the present invention, a further embodiment of the knot joint is shown at 34 in FIG. 16. Summarily said joint comprises a hollow spherical core 35 provided with threaded holes 36 around its outer surface. Stems 37 forming the end portion of a preferably cylindrical pin 38 are screwed therein, the other end of said pin being provided with an annular flange 39.

At 40 it has been indicated an insert consisting of a substantially cylindrical hollow body made up of two parts having different diameters. One of them, 41, of a bigger diameter, is provided with a round rim 42 slightly recessed with respect to said portion 41 which fixedly engages with one end 43 of each rod 44. Preferably the portion 41 of said insert 40 has the same diameter as the rod 44 so as to form a continuous body with the latter. At its opposite end said insert 40 exhibits a portion 45 of smaller diameter than portion 41, provided with a screw thread 46 around its outer surface. The screw thread 46 engages with a corresponding thread 47 of a substantially cylindrical ring nut 48 comprising two distinct inner zones. In the first one the portion 45 of the insert 40 is screwed, this zone being shaped so that the thread 47 thereof can mate with the thread 46 of said insert. The shape of the second zone is suitable to receive the flange 39 and prevent it from coming out. For the purpose the ring nut 48 is provided with an annular projection 49.

Eventually the end portion of the rod 44 might exhibit a circumferential outer thread adapted to be screwed in the respective ring nut 48. In this case the insert 40 should be eliminated as well as the weld of the rod 44.

The assembling takes place as follows: the stem portion 37 of pin 38 is screwed in each one of the holes 36 of every core 35 after introducing it into the ring nut 48;

the ring nut 48 is afterwards screwed on the insert 40 by virtue of the threads 46 and 47. In this way the knot joint is assembled in a very compact manner.

The invention thus attains the intended purposes.

In fact the connection achieved appears very rigid and reliable. In addition, the joint structure and the procedure for constructing it do not vary on varying the number and position of the rods leading off to the joint itself. Special workings are thus avoided and all joints can have similar prices.

Finally it should be understood that with the joint in accordance with the present invention it is possible to arrange the clamps 8 each time so that they can be in the right number and have the appropriate sizes depending upon the stresses they have to bear each time. Therefore there is no need to oversize the elements subjected to weaker stresses and that should result in a remarkable lightening of the structures and consequently in an important saving of money.

Practically the knot joint obtained is polyvalent and adaptable to the most different situations without any important changes in the structure thereof and with reduced costs.

Furthermore, it is always possible to carry out the molding of half-balls provided with the necessary number of inserts 18 and join them together next, so as to reduce the costs and optimize the working times.

A further advantage resulting from what above consists in that also the inserts 18 can be molded every time so that the sizes thereof can correspond to the design values, which further improves the compression work of the rods upon the cores while lightening the structure.

Finally the knot joint according to the second alternate embodiment is much cheaper than those of different conception owing to the fact that, fewer workings being necessary, it will be easier to intervene, should any replacement and/or change be needed.

Obviously various modifications may be made in the details of construction of the knot joint according to the present invention without departing from the principles thereof as hereinbefore described and as defined in the appended claims.

What we claim is:

1. A knot joint for network structures of the kind adapted to engage a number of rods converging to the joint from any direction, the knot joint comprising:
   a central core, the central core being shaped as a spherical ball;
   a first coupling means rigidly secured to the spherical ball, the first coupling means having a clamp means formed by a pair of shaped portions close to each other and a base portion, said base portion being welded to the spherical ball according to any prescribed direction;
   a second coupling means secured to the first coupling means and adapted to be secured to a rod, the second coupling means having an insert portion adapted to engage and interlock with the clamp means of the first coupling means, the clamp means and the insert portion being complementary in shape to allow the insert portion to be received by said clamp means and to prevent radial movement of the rod with respect to the spherical ball; and
   means for locking the clamp means with the insert portion, the locking means being adapted to prevent sliding movement of the rod with respect to the spherical ball of the central core and including, for each clamp means and insert portion to be interlocked together, a single bolt passing through a plurality of holes respectively formed in the pair of shaped portions of said clamp means and insert portion.

2. The joint according to claim 1, which further comprises means for aligning the first coupling means to the spherical ball, the aligning means including centering pegs inserted into said clamp means and said spherical ball.

3. The joint according to claim 1, wherein said base portion of said first coupling means includes substantially flattened portions which are welded on said spherical ball in order to secure the first coupling means to the ball.

4. The joint according to claim 1, wherein said insert portion include a tooth-shaped tailpiece.

5. The joint according to claim 1, wherein said spherical ball is hollow, and is provided with a pair of diametrically opposed polar holes formed through its surface and includes an increased surface thickness in proximity to the polar holes.

* * * * *